United States Patent
Namba et al.

(10) Patent No.: US 10,280,011 B2
(45) Date of Patent: May 7, 2019

(54) WORKPIECE POSITION DETECTING METHOD AND HANGER MAINTENANCE-WORK NECESSITY JUDGING METHOD

(71) Applicant: HONDA MOTOR CO., LTD., Minato-ku, Tokyo (JP)

(72) Inventors: Nobuhiro Namba, Tochigi-ken (JP); Atsushi Ueyama, Tochigi-ken (JP); Masakazu Adachi, Tochigi-ken (JP); Akihiro Ishitani, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/877,411

(22) Filed: Jan. 23, 2018

(65) Prior Publication Data

US 2018/0208406 A1 Jul. 26, 2018

(30) Foreign Application Priority Data

Jan. 26, 2017 (JP) ................................ 2017-011763

(51) Int. Cl.
  *B62D 65/18* (2006.01)
  *B65G 17/20* (2006.01)
  *B65G 43/08* (2006.01)
  *B65G 47/49* (2006.01)

(52) U.S. Cl.
  CPC ............ *B65G 47/49* (2013.01); *B62D 65/18* (2013.01); *B65G 17/20* (2013.01); *B65G 43/08* (2013.01); *B65G 2201/0294* (2013.01); *B65G 2203/0233* (2013.01); *B65G 2203/046* (2013.01)

(58) Field of Classification Search
  CPC .................. B65G 47/49; B65G 43/08; B65G 2201/0294; B65G 47/61; B65G 17/20; B62D 65/18
  USPC .............................. 198/465.4, 502.3, 341.05
  See application file for complete search history.

(56) References Cited

U.S. PATENT DOCUMENTS

| 4,924,996 A * | 5/1990 | Svensson ................ B05B 15/62 198/341.05 |
| 6,516,239 B1 * | 2/2003 | Madden ............ G05B 19/41815 198/349 |
| 6,814,219 B2 * | 11/2004 | Shimizu ................. B62D 65/18 104/172.4 |

(Continued)

FOREIGN PATENT DOCUMENTS

| JP | 2006-347646 | 12/2006 |
| JP | 2011-121774 | 6/2011 |

*Primary Examiner* — Mark A Deuble
(74) *Attorney, Agent, or Firm* — Amin, Turocy & Watson LLP (57) ABSTRACT

The stop position of a workpiece is detected by a position detection unit. A control unit calculates and records a difference between the detected stop position (actual stop position) and a reference stop position set in advance. After recording the difference multiple times, the control unit performs a statistical processing of the differences and calculates a compensation amount based on results of the statistical processing. In the next position detecting, the position detection unit is disposed at a compensated position which is obtained by adding the compensation amount to the reference stop position, and in this state, detects the position of a predetermined portion of the workpiece.

6 Claims, 5 Drawing Sheets

(56) References Cited

U.S. PATENT DOCUMENTS

| | | | |
|---|---|---|---|
| 8,485,343 B2* | 7/2013 | Kimata | H01L 21/67069 198/341.02 |
| 8,800,745 B2* | 8/2014 | Spangler | B65G 35/066 118/323 |
| 9,902,568 B2* | 2/2018 | Lee | B65G 47/53 |
| 2002/0175041 A1* | 11/2002 | Moshgbar | B65G 43/08 198/340 |
| 2003/0079964 A1* | 5/2003 | Kilabarda | B62D 65/18 198/678.1 |
| 2009/0038910 A1* | 2/2009 | Noda | B21D 43/13 198/371.1 |

* cited by examiner

FIG. 5

WORKPIECE POSITION DETECTING METHOD AND HANGER MAINTENANCE-WORK NECESSITY JUDGING METHOD

CROSS-REFERENCE TO RELATED APPLICATION

This application is based upon and claims the benefit of priority from Japanese Patent Application No. 2017-011763 filed on Jan. 26, 2017, the contents of which are incorporated herein by reference.

BACKGROUND OF THE INVENTION

Field of the Invention

The present invention relates to a workpiece position detecting method for detecting the position of a workpiece carried by a hanger, and further, to a hanger maintenance-work necessity judging method for judging the necessity of the maintenance work of a hunger.

Description of the Related Art

As a transfer mechanism, there is known a mechanism that transfers a workpiece suspended by a hanger together with the hunger (see Japanese Laid-Open Patent Publication No. 2006-347646). For example, in a manufacturing plant for automobiles, vehicle bodies are transferred as workpieces.

Specifically, in this case, as described in Japanese Laid-Open Patent Publication No. 2011-121774, vehicle bodies are suspended by hungers, and the hangers together with the vehicle bodies are transferred one after another to an assembling station along guide rails. At the assembling station, each hanger with the vehicle body suspended thereby is stopped, and in this state, a transfer robot grips a component and performs a positioning (temporary assembling) of the component to the vehicle body. Furthermore, a fastening robot tightens bolts. Thus, the component is connected to the vehicle body by the bolts.

SUMMARY OF THE INVENTION

When the vehicle body is stopped at a position deviated from a predetermined assembling position for any reason, the position of the vehicle body does not correspond to the position of the component transferred by the transfer robot, and thus, the aforementioned temporary assembling becomes difficult to be performed. To avoid this, it has been practiced to roughly detect the position of the vehicle body by use of a position sensor and to judge whether or not the difference between a reference stop position and an actual stop position of the vehicle body falls within an allowable range. If the difference falls within the allowable range, the temporary assembling and the tightening are carried out. On the other hand, if the difference falls outside the allowable range, fine position detection is carried out, and a judgment is made again on whether the difference falls within the allowable range or not.

However, where the re-judgment is made like this, a long period of time is required from stopping of the vehicle body to fastening thereof. In particular, in the case that such judgment is repeatedly made, production efficiency of automobiles is lowered.

Accordingly, a primary object of the present invention is to provide a workpiece position detecting method capable of precisely detecting the position of a workpiece transferred by a hanger.

Another object of the present invention is to provide a hanger maintenance-work necessity judging method capable of easily judging whether the maintenance work of a hanger is necessary or not.

According to one aspect of the present invention, there is provided a workpiece position detecting method for detecting, by a position detection unit, a stop position of a predetermined portion of each of workpieces, which are supported individually by a plurality of hangers, when each of the workpieces is stopped after being transferred together with the hangers by a transfer mechanism, or a stop position of a predetermined portion of each of the hangers when each of the hangers is stopped, the method including the steps of:

recording, multiple times, a difference between the stop position of the predetermined portion of the workpiece or the hanger when the hanger is stopped after transferring the workpiece, and a reference stop position set in advance;

performing a statistical processing based on the differences recorded the multiple times to thereby calculate a compensation amount for each of the hangers;

disposing the position detection unit at a compensated position obtained by adding the compensation amount to the reference stop position; and detecting, by the position detection unit disposed at the compensated position, the stop position of the predetermined portion of the hanger or the stop position of the predetermined portion of the workpiece stopped after being transferred by the hanger.

That is, in this case, the compensation amount is calculated based on the differences, and in the next position detecting, the position detection unit is placed at the compensated position which is obtained by adding the compensation amount to the reference stop position. By this compensation, the position detection unit can be made to correspond to an actual stop position (i.e., the positions of the position detection unit can coincide with or come close to the detecting position suitable for the actual stop position), and thus, it is possible for the position detection unit to easily detect the predetermined portion of the workpiece just one time. Therefore, it is unnecessary to perform a fine detection for position again, and thus, in this respect, it is possible to shorten the time required for the position detecting. That is, the efficiency in position detecting can be improved.

When suspending and transferring of the workpiece by the hanger are repeated, the compensation amount is liable to exceed an allowable compensation amount. At this point of time, it can be judged that the maintenance work for the hanger has become necessary. That is, according to another aspect of the present invention, there is provided a hanger maintenance-work necessity judging method for judging the necessity of a maintenance work for a hanger which supports a workpiece and is transferred together with the workpiece by a transfer mechanism, the method including the steps of:

recording, multiple times, a difference between a stop position of a predetermined portion of the hanger or the workpiece when the hanger is stopped after transferring the workpiece, and a reference stop position set in advance;

performing a statistical processing based on the differences recorded the multiple times to calculate a compensation amount;

disposing a position detection unit at a compensated position obtained by adding the compensation amount to the reference stop position;

detecting, by the position detection unit disposed at the compensated position, the stop position of the predetermined portion of the hanger or the stop position of the predetermined portion of the workpiece stopped after being transferred by the hanger; and comparing the stop position which is detected by the position detection unit disposed at the compensated position, with the reference stop position;

wherein the maintenance work of the hanger is judged to be necessary if the compensation amount exceeds an allowable compensation amount set in advance.

In this case, when the compensation amount exceeds the allowable compensation amount, the maintenance work is judged to be necessary. Accordingly, it is possible to perform the maintenance work before malfunction of the hanger. This can avoid a situation that the hanger malfunctions in the course of transferring the workpiece whereby the transfer of the workpiece must be stopped. That is, it is possible to effectively prevent such an unfavorable influence from being exerted on the transfer of the workpiece.

Incidentally, in the statistical processing, for example, an average value of the differences recorded the multiple times may be calculated. In this case, an advantage can be obtained that the calculation is easy.

Further, it may be the case that the necessary compensation amount differs depending on the respective hangers. Accordingly, it is preferable to provide each of the hangers with an identification member. This makes it possible to set an appropriate compensation amount for each of the hangers having respective identifiers. That is, it is possible to set compensation amounts to respective hangers individually.

According to the present invention, first a difference between the actual stop position and the reference stop position of the workpiece or the hanger is calculated, and the compensation amount is determined based on the difference. Then, in the next position detecting, the position detection unit is disposed at a compensated position which is obtained by adding the compensation amount to the reference stop position. Accordingly, the position detection unit can correspond to the actual stop position, i.e., the position of the position detection unit can coincide with or come close to the detecting position suitable for the actual stop position.

As a result, by one-time detecting, the position detection unit can easily detect the predetermined portion of the workpiece. Therefore, because it is not necessary to perform any fine detection for a position again, the time taken for the position detecting can be shortened, whereby the efficiency of the position detection can be improved.

Further, when the compensation amount exceeds the allowable compensation amount, it is judged that the maintenance work of the hanger has become necessary. For this reason, it is possible to perform the maintenance work before the hanger malfunctions. Consequently, a situation can be avoided that the hanger malfunctions in the course of transferring the workpiece, and hence, an unfavorable influence can be prevented from being exerted on the transfer of the workpiece.

The above and other objects, features and advantages of the present invention will become more apparent from the following description when taken in conjunction with the accompanying drawings, in which a preferred embodiment of the present invention is shown by way of an illustrative example.

DESCRIPTION OF THE PREFERRED EMBODIMENTS

Hereinafter, with reference to the accompanying drawings, detailed description will be made regarding a hanger maintenance-work necessity judging method according to a preferred embodiment of the preset invention in connection with a workpiece position detecting method. Incidentally, the terms "Front", "Rear", "Right" and "Left" in the drawings respectively means forward, rearward, rightward and leftward directions as viewed from a user seated on a driver's seat.

Figure 1:
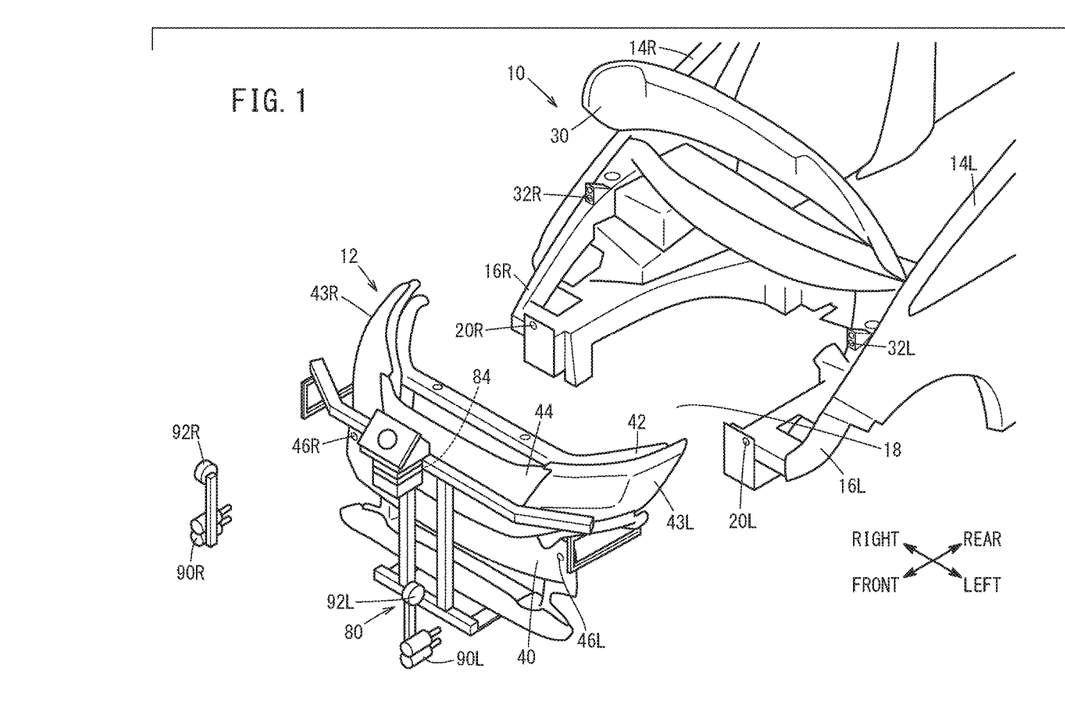
FIG. 1 is a schematic perspective view of main parts of a vehicle body and a front end module.

First, with reference to FIG. 1, an overview will be provided of a vehicle body 10 being a workpiece and a front end module 12 to be mounted on the vehicle body 10.

The vehicle body 10 has, on the forward side, a left-front side member 16L protruding from a left A-pillar 14L and a right-front side member 16R protruding from a right A-pillar 14R. In this case, a front cross member is not provided between the left-front side member 16L and the right-front side member 16R, so that a large opening 18 is formed between the left-front side member 16L and the right-front side member 16R. This opening 18 provides a mounting space in which the front end module 12 is mounted.

A left-front bolt hole 20L and a right-front bolt hole 20R are formed at respective front end surfaces of the left-front side member 16L and the right-front side member 16R. Further, on the left-front side member 16L and the right-front side member 16R, a left-rear bolt hole 32L and a right-rear bolt hole 32R are formed at respective positions covered with a bonnet 30. These left-rear bolt hole 32L and right-rear bolt hole 32R and the left-front bolt hole 20L and the right-front bolt hole 20R function as predetermined portions used in detecting the position of the vehicle body 10.

The front end module 12 is an assembly configured to include a front bumper 40, a front bumper beam 42, a left headlight 43L, a right headlight 43R, a front grille 44 and the like. The front bumper 40 is formed with a left bolt insertion hole 46L and a right bolt insertion hole 46R which are to overlap respectively on the left-front bolt hole 20L and the right-front bolt hole 20R. Further, the front bumper beam 42 is formed with two bolt insertion holes (not shown) which are to overlap respectively on the left-rear bolt hole 32L and the right-rear bolt hole 32R.

Next, an overview will be provided of a mounting apparatus for mounting the front end module 12 on the vehicle body 10.

Figure 2:
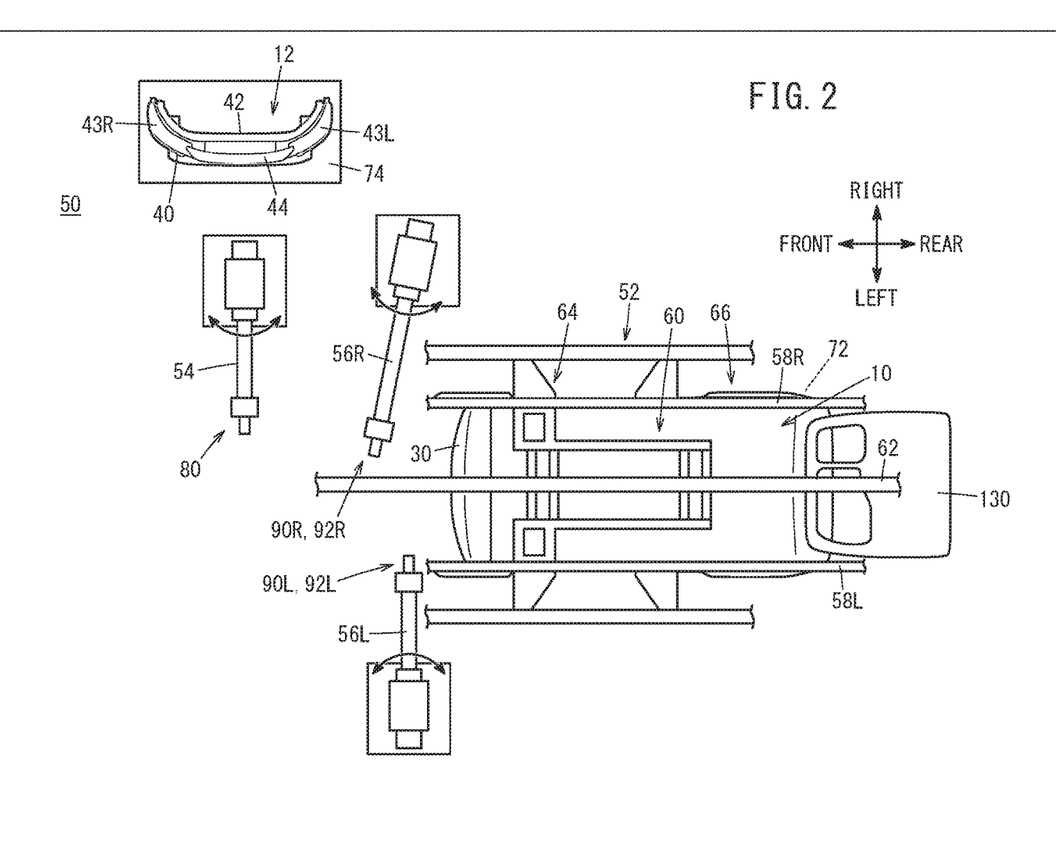
FIG. 2 is a schematic plan view of main parts of a mounting apparatus for implementing a workpiece position detecting method and a hanger maintenance-work necessity judging method according to an embodiment of the present invention.

FIG. 2 is a plan view schematically showing main portions of the mounting apparatus 50 installed at an assembling station. This mounting apparatus 50 is equipped with a transfer mechanism 52 for transferring the vehicle body 10 in a suspended state and three robots 54, 56L, 56R.

The transfer mechanism 52 has guide rails 58L, 58R which extend mutually in parallel on respective upper-left and upper-right sides of the vehicle body 10, a hanger 60 for suspending the vehicle body 10, and a suspension rail 62 supporting the hanger 60 through a drive slider (not shown). The hanger 60 is provided with a plurality of driven wheels (not shown) slidably engaged with the guide rails 58L, 58R. Thus, the drive slider is moved along the suspension rail 62, whereby the hanger 60 and the vehicle body 10 are moved along the guide rails 58L, 58R. The traveling direction of the vehicle body 10 is the leftward direction in FIG. 1.

Although FIG. 2 shows one hanger 60 only, actually a plurality of hangers 60 are movably mounted on the guide rails 58L, 58R. That is, the vehicle bodies 10 on which the front end modules 12 are to be mounted are transferred to the assembling station in succession.

The hanger 60 has a front suspension portion 64 for suspending a vehicle-body front portion and a rear suspension portion 66 for suspending a vehicle-body rear portion. The front suspension portion 64 and the rear suspension portion 66 respectively have right-side arms 68a, 68b shown in FIG. 3 and respective left-side arms (not shown). Although not shown, ends of these right-side arms 68a, 68b and left-side arms are bent inward in a vehicle width direction beneath the vehicle body 10. That is, the hanger 60 supports the vehicle body 10 from below by the bent ends of two pairs of arms.

Figure 3:
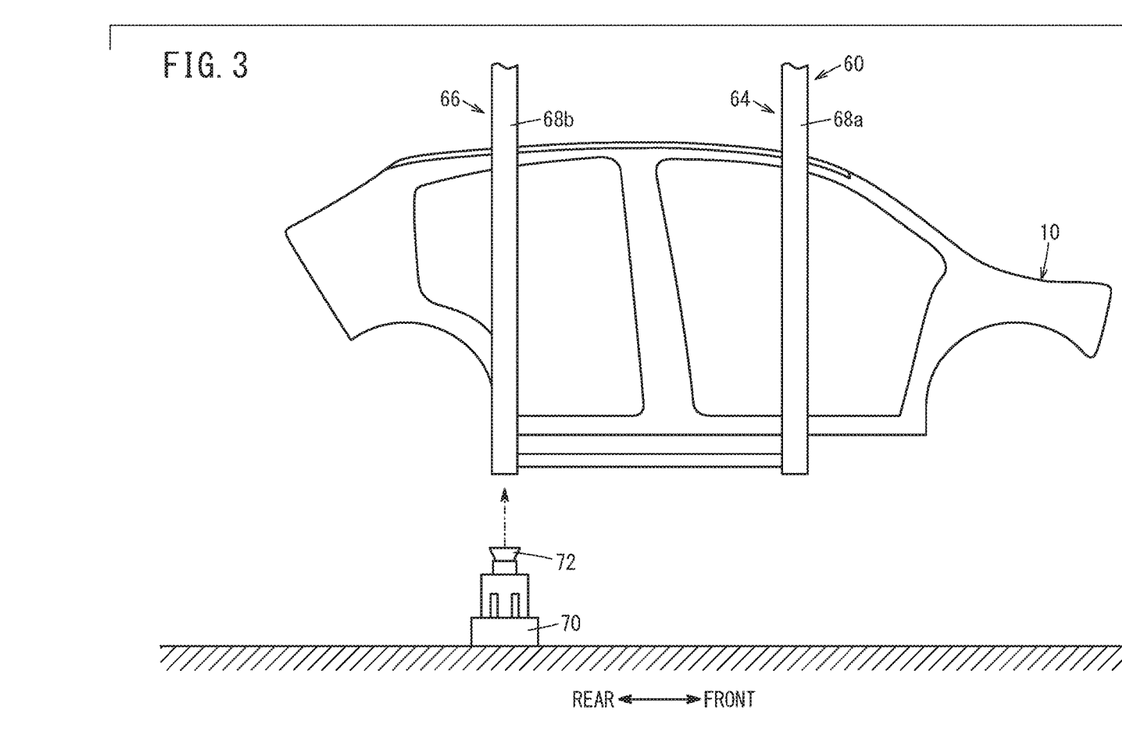
FIG. 3 is a schematic right side view showing a state that a hanger of the mounting apparatus shown in FIG. 2 suspends the vehicle body being a workpiece.

The right side arm 68b of the rear suspension portion 66 has, on its bottom surface, a unique identifier (identification member) (not shown) such as a barcode, a QR code (which is a registered trademark of DENSO WAVE INCORPORATED) or the like. Further, a pedestal 70 is installed on a floor at the assembling station, and a reading sensor 72 with a reading unit oriented upward in the vertical direction is provided on the pedestal 70. The reading sensor 72 reads the identifier.

Of course, the identifier differs for each individual hanger 60. Thus, it is possible to identify each hanger 60 by reading the identifier provided thereon. That is, it is possible to distinguish the hangers 60 from each other.

The three robots 54, 56L, 56R are articulated robots for general purpose and are each a six-axis robot, for example. These three robots 54, 56L, 56R are arranged at respective positions which do not obstruct transferring of the vehicle body 10.

Of the three robots, one is a transfer robot 54 for gripping one module from among a plurality of front end modules 12 temporarily placed at a stock yard 74 and transferring the one module 12 to the vehicle body 10. Incidentally, at the stock yard 74, the front end modules 12 are supported on a support table (not shown).

Further, an end arm of the transfer robot 54 is provided with a gripping jig 80 shown in FIG. 1. This gripping jig 80 is constituted to include a clamping portion 84 which is movable vertically under the operation of an air cylinder (not shown).

Two other robots than the transfer robot 54 are a first fastening robot 56L and a second fastening robot 56R. End arms of the first fastening robot 56L and the second fastening robot 56R are provided with nut runners 90L, 90R, respectively. The nut runners 90L, 90R turn nuts (not shown) with respect to bolts inserted into the aforementioned predetermined bolt insertion holes and bolt holes.

As the first fastening robot 56L and the second fastening robot 56R are operated appropriately, the positions of their end arms are changed. Accordingly, the positions and postures of the nut runners 90L, 90R are changed.

The end arms are further provided respectively with position sensors 92L, 92R being position detection units. The position sensors 92L, 92R mainly detect the left-rear bolt hole 32L, the right-rear bolt hole 32R, the left-front bolt hole 20L and the right-front bolt hole 20R formed on the vehicle body 10.

In the construction described above, the drive slider, the reading sensor 72, the transfer robot 54, the first fastening robot 56L, the second fastening robot 56R, the nut runners 90L, 90R, the position sensors 92L, 92R and the like are electrically connected to a control unit (not shown).

In the mounting apparatus 50 basically constructed as described above, the workpiece position detecting method according to the present embodiment is implemented as follows. Incidentally, the following steps or operations are carried out under control of the control unit.

The front end module 12 and the vehicle body 10 are manufactured at other work stations separately provided. The front end module 12 is transferred to the assembling station and is temporarily placed in a standing posture at the stock yard 74 in a state of being supported on the support table (not shown). On the other hand, the vehicle body 10 is suspended from the hanger 60.

When the drive slider provided on the hanger 60 is driven, the drive slider is moved along the suspension rail 62, and at the same time, the driven wheels are moved along the guide rails 58L, 58R. With this operation, the hanger 60 and the vehicle body 10 held by the hanger 60 slowly move leftward (forward) in FIG. 2. At this time, the bonnet 30 and a rear hatch 130 are kept in an open state.

When the vehicle body 10 reaches a predetermined position (mounting position), the hanger 60 is clamped, and thus, the hanger 60 and the vehicle body 10 are stopped. At this time, the reading sensor 72 (see FIG. 3) reads the identifier provided on the hanger 60. Where the identifier on the hanger 60 is an identifier A, the control unit recognizes that "the hanger 60 with the identifier A thereon has been stopped after being transferred to the assembling station".

Incidentally, by providing the hanger 60 with a plurality of identical identifiers, it is possible for the reading sensor 72 to read one of the plural identifiers even when the hanger 60 is not stopped at the predetermined stop position. That is, discrimination (identification) of the hangers 60 becomes easy.

On the other hand, the arm portion of the transfer robot 54 is turned, so that the end arm approaches the stock yard 74. Then, the end arm is appropriately operated, whereby predetermined portions of the gripping jig 80 enter a lower side of the front bumper 40, a lower side of the left headlight 43L and a lower side of the right headlight 43R. Further, the air cylinder is operated to thereby extend a rod of the air cylinder downward. Thus, the front end module 12 is clamped by the clamping portion 84. As a result, the front end module 12 is gripped.

Furthermore, the first fastening robot 56L and the second fastening robot 56R are appropriately operated. At this time, the position sensors 92L, 92R detect the positions (stop positions of the predetermined portions) of the left-rear bolt hole 32L, the right-rear bolt hole 32R, the left-front bolt hole 20L and the right-front bolt hole 20R formed on the vehicle body 10. The control unit, when receiving these positions as information, calculates a difference between these positions and reference stop positions set in advance, and records the difference.

Here, as the reference stop positions, there can be used, for example, stop positions in design (in other words, an ideal stop position) which can be calculated based on, for example, the dimensions, rigidities and the like of the guide rails 58L, 58R and the hanger 60. Every time the hanger 60 with the identifier A thereon is transferred again to the assembling station in a state of suspending the vehicle body 10, the control unit records the aforementioned difference.

When the difference lies within an allowable range set in advance, the arm portion of the transfer robot 54 is turned, whereby as shown in FIG. 1, the front end module 12 is transferred to locate its rear side on a front side of the vehicle body 10. In other words, the front end module 12 is disposed in the opening 18 between the left-front side member 16L and the right-front side member 16R. At this time, the left-front bolt hole 20L and the right-front bolt hole 20R overlap respectively on the left bolt insertion hole 46L and the right bolt insertion hole 46R formed on the front bumper 40.

Thereafter, bolts are inserted respectively into the left-front bolt hole 20L and the left bolt insertion hole 46L overlapping with each other and into the right-front bolt hole 20R and the right bolt insertion hole 46R also overlapping with each other. Further, the arm portions of the first fastening robot 56L and the second fastening robot 56R are appropriately operated to bring the nut runners 90L, 90R into respective fastening postures. Then, the nut runners 90L, 90R tighten nuts (not shown) on the bolts.

Further, bolts are screwed into the left-rear bolt hole 32L, the light-rear bolt hole 32R and the two bolt insertion holes. Onto these bolts, nuts are tightened by the nut runners 90L, 90R provided on the first fastening robot 56L and the second fastening robot 56R. By the aforementioned fastening operation, the front end module 12 is mounted on the vehicle body 10.

The above mounting operation and the recording of the difference are also carried out for each of the hangers 60 on which other identifiers (identifiers B, C, D, . . . ) than the identifier A are attached. Since the hangers 60 are moved to circulate in a plant including the assembling station, when the operations are repeated, the hanger 60 with the identifier A thereon is transferred again to the assembling station in the state of suspending the vehicle body 10.

Figure 4:
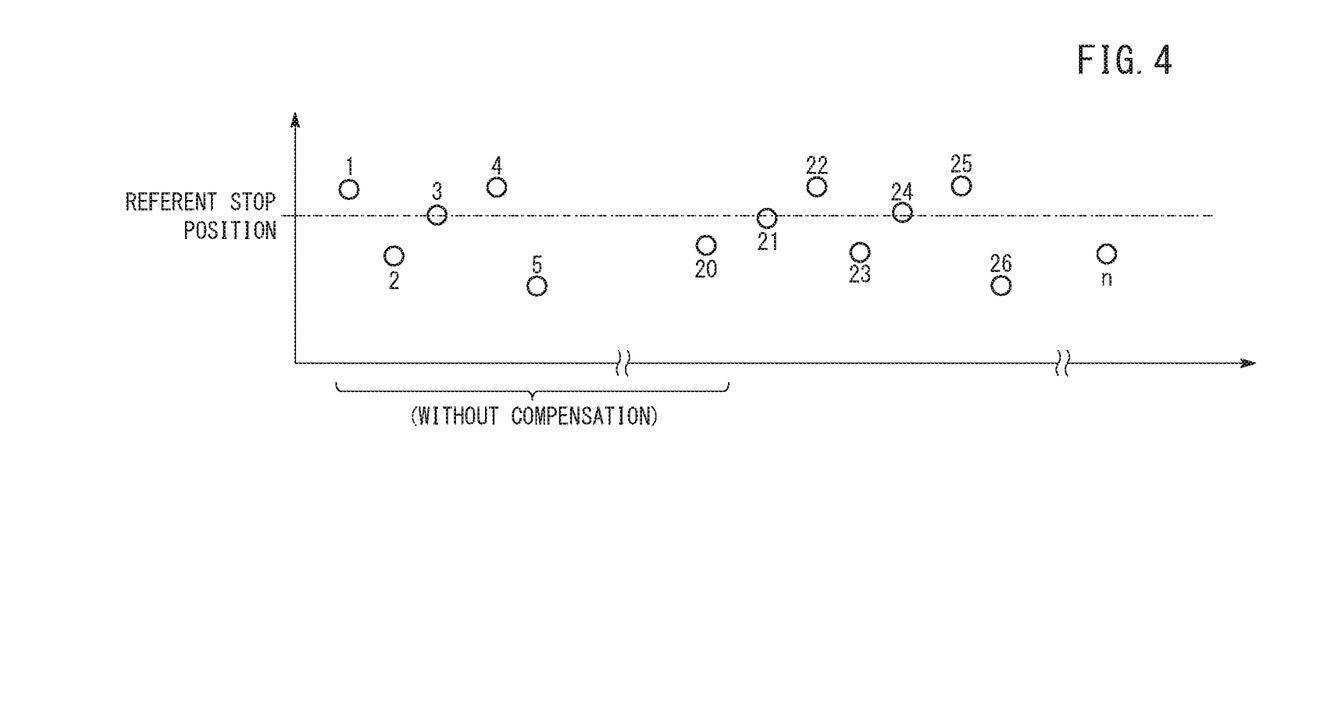
FIG. 4 is a graph showing a relationship of the difference between an actual stop position and a reference stop position of the vehicle body to the number of times of position detecting.

One example of a recording result of the differences is shown in FIG. 4 in the form of a graph. In the graph, the horizontal axis indicates the number of times of position detecting, and the vertical axis indicates the amount of the difference. As shown in FIG. 4, the stop position of the vehicle body 10 slightly deviate from the reference stop position.

The above-described position detecting is repeated a predetermined number of times (20 times, for example), and differences are recorded and stored in the control unit for each of the hangers 60. Subsequently, the control unit executes statistical processing on the differences recorded until then. That is, for example, an average value of the differences is calculated. Alternatively, the differences may be approximated to a first-order approximate curve or a second-order approximate curve. The control unit utilizes the result of this statistical processing as a compensation amount.

When, for example, the 21st position detecting is performed on the hanger 60 having the identifier A and for which the statistical processing on the differences has been performed in the above way, the control unit controls the first fastening robot 56L and the second fastening robot 56R to place their respective end arms, i.e., the position sensors 92L, 92R, at respective compensated positions which are deviated from the reference stop positions by the compensation amount. At the compensated positions, the position sensors 92L, 92R detect the left-front bolt hole 20L, the right-front bolt hole 20R, the left-rear bolt hole 32L and the right-rear bolt hole 32R.

Where the hanger 60 repetitively suspends and transfers the vehicle body 10, it may occur that the difference between the actual stop position and the reference stop position of the vehicle body 10 becomes larger due to an increase in the deflection of the hanger 60 or the like. Where the difference falls outside the allowable range, it becomes difficult for the position sensors 92L, 92R to detect the left-front bolt hole 20L, the right-front bolt hole 20R, the left-rear bolt hole 32L and the right-rear bolt hole 32R. For this reason, it becomes necessary to perform the position detection again.

However, in the present embodiment, the compensation amount is calculated by executing the statistical processing of the differences, and the position sensors 92L, 92R are disposed at the respective compensated positions each obtained by adding the compensation amount to the reference stop position, and then perform position detecting. By performing such compensations, it is possible to make the position sensors 92L, 92R correspond to the actual stop position of the vehicle body 10, i.e., make the positions of the sensors coincide with or come close to the sensor positions suitable for the actual stop position.

Accordingly, in this case, it is easy for the position sensors 92L, 92R to detect the left-front bolt hole 20L, the right-front bolt hole 20R, the left-rear bolt hole 32L and the right-rear bolt hole 32R. Therefore, it is not necessary to perform the position detection again. This enables the front end module 12 to be mounted on the vehicle body 10 efficiently.

Because the deflection amount or the like differs for each hanger 60, a compensation amount for a certain hanger 60 is not necessarily appropriate for another hanger 60. Therefore, in this embodiment, the compensation amount is set for each of the hangers 60. That is, the compensated positions for the position sensors 92L, 92R differ depending on the identifier. For this reason, for each of the hangers 60, it becomes easy for the position sensors 92L, 92R to detect the left-front bolt hole 20L, the right-front bolt hole 20R, the left-rear bolt hole 32L and the right-rear bolt hole 32R, and hence, efficiency is further improved in assembling the front end module 12 to the vehicle body 10.

Further, even in the same hanger 60, it may occur that the deflection amount differs when a vehicle body 10 for a different vehicle model is suspended. Accordingly, it is preferable to calculate the compensation amount for each of the vehicle models. Of course, also in this case, the compensation amounts for the respective hangers 60 are calculated individually.

Even after the calculation of the compensation amount, the control unit records the difference every time. After the execution of the statistical processing, position detecting is performed a predetermined number of times (30 times, for example). Then, in the next position detecting, the statistical processing is performed on differences obtained in the position detecting performed after the preceding statistical processing. For example, where the preceding statistical processing has been performed on the differences obtained in the 1st position detecting to the 20th position detecting, the next statistical processing is performed on the differences obtained in the 21st position detecting to the 50th position detecting.

Like this, because the compensation amount is calculated from the differences obtained in the latest position detecting, the position sensors 92L, 92R can easily be made to correspond to the actual stop position.

Figure 5:
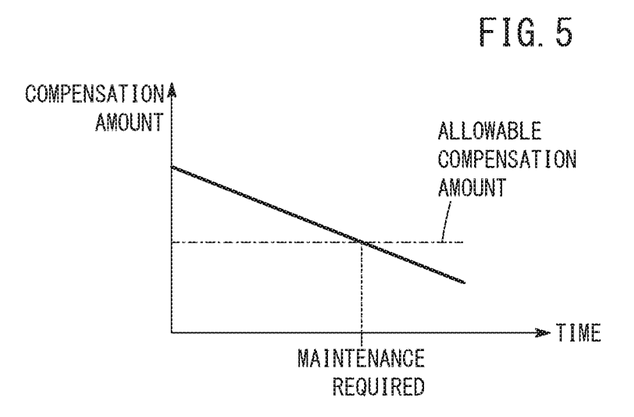
FIG. 5 is a graph showing a relationship of compensation amounts to an allowable compensation amount.

Repetition of transfer of the vehicle body by the hanger 60 causes the compensation amount to exceed (fall below) the allowable compensation amount, as shown in FIG. 5. When such a situation occurs, the control unit issues a warning of "maintenance work is necessary". The warning is given by, for example, display on a display unit, making of an alarm sound, or the like. In this case, the worker removes the indicated hanger 60 from the guide rails 58L, 58R and performs maintenance work on the removed hanger 60.

As described above, according to the present embodiment, it is also easy to make a judgment on whether maintenance work of the hanger 60 is necessary or not. Accordingly, it is possible to prevent the hanger 60 from resulting in failure.

The present invention is not limited particularly to the foregoing embodiment. The present invention can be variously modified without departing from the scope of the present invention.

For example, the position sensors 92L, 92R may be carried by devices other than the fastening robots or may be fixedly positioned at prescribed places.

Further, instead of detecting the stop position of the predetermined portion on the vehicle body 10 (workpiece), it is possible to detect the stop position of a predetermined portion on the hanger 60.

What is claimed is:

1. A workpiece position detecting method for detecting, by a position detection unit, a stop position of a predetermined portion of each of workpieces which are supported individually by a plurality of hangers, when each of the workpieces is stopped after being transferred together with the hangers by a transfer mechanism, or a stop position of a predetermined portion of each of the hangers when each of the hangers is stopped, the method comprising the steps of:
   recording, multiple times, a difference between the stop position of the predetermined portion of the workpiece or the hanger when the hanger is stopped after transferring the workpiece, and a reference stop position set in advance;
   performing a statistical processing based on the differences recorded the multiple times to thereby calculate a compensation amount for each of the hangers;
   disposing the position detection unit at a compensated position obtained by adding the compensation amount to the reference stop position; and
   detecting, by the position detection unit disposed at the compensated position, the stop position of the predetermined portion of the hanger or the stop position of the predetermined portion of the workpiece stopped after being transferred by the hanger.

2. The workpiece position detecting method according to claim 1, wherein the statistical processing is performed to calculate an average value of the differences recorded the multiple times.

3. The workpiece position detecting method according to claim 1, wherein each of the hangers is provided with an identification member.

4. A hanger maintenance-work necessity judging method for judging necessity of a maintenance work of a hanger which supports a workpiece and is transferred together with the workpiece by a transfer mechanism, the method comprising the steps of:
   recording, multiple times, a difference between a stop position of a predetermined portion of the hanger or the workpiece when the hanger is stopped after transferring the workpiece, and a reference stop position set in advance;
   performing a statistical processing based on the differences recorded the multiple times to calculate a compensation amount;
   disposing a position detection unit at a compensated position obtained by adding the compensation amount to the reference stop position;
   detecting, by the position detection unit disposed at the compensated position, the stop position of the predetermined portion of the hanger or the stop position of the predetermined portion of the workpiece stopped after being transferred by the hanger; and
   comparing the stop position which is detected by the position detection unit disposed at the compensated position, with the reference stop position;
   wherein the maintenance work of the hanger is judged to be necessary if the compensation amount exceeds an allowable compensation amount set in advance.

5. The hanger maintenance-work necessity judging method according to claim 4, wherein the statistical processing is performed to calculate an average value of the differences recorded the multiple times.

6. The hanger maintenance-work necessity judging method according to claim 4, wherein each of the hangers is provided with an identification member.

* * * * *